United States Patent
Cho et al.

(10) Patent No.: US 11,586,333 B2
(45) Date of Patent: Feb. 21, 2023

(54) TOUCH DEVICE, TOUCH DISPLAY DEVICE INCLUDING THE SAME AND METHOD OF DRIVING THE SAME

(71) Applicant: LG Display Co., Ltd., Seoul (KR)

(72) Inventors: Seong-Tae Cho, Paju-si (KR); Gyeong-Jin Hwang, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 17/527,123

(22) Filed: Nov. 15, 2021

(65) Prior Publication Data

US 2022/0206639 A1 Jun. 30, 2022

(30) Foreign Application Priority Data

Dec. 29, 2020 (KR) .......................... 10-2020-0186109

(51) Int. Cl.
*G06F 3/044* (2006.01)
*G06F 3/041* (2006.01)
*G09G 3/20* (2006.01)

(52) U.S. Cl.
CPC .......... *G06F 3/0446* (2019.05); *G06F 3/0412* (2013.01); *G06F 3/04166* (2019.05); *G09G 3/2092* (2013.01); *G09G 2310/0275* (2013.01); *G09G 2310/08* (2013.01)

(58) Field of Classification Search
CPC ................................................... G06F 3/0446
See application file for complete search history.

(56) References Cited

U.S. PATENT DOCUMENTS

| | | | |
|---|---|---|---|
| 9,459,746 B2 | 10/2016 | Rosenberg et al. | |
| 9,746,964 B2 | 8/2017 | Rosenberg et al. | |
| 10,073,565 B2 | 9/2018 | Rosenberg et al. | |
| 10,534,478 B2 | 1/2020 | Rosenberg et al. | |
| 11,068,118 B2 | 7/2021 | Rosenberg et al. | |
| 2013/0057480 A1* | 3/2013 | Brunet .................. | G06F 3/0446 345/173 |
| 2014/0240280 A1* | 8/2014 | Ekici ................. | G06F 3/041662 345/174 |
| 2015/0091859 A1 | 4/2015 | Rosenberg et al. | |
| 2017/0075496 A1 | 3/2017 | Rosenberg et al. | |
| 2017/0322674 A1 | 11/2017 | Rosenberg et al. | |
| 2018/0348931 A1* | 12/2018 | Kim .................. | G06F 3/041662 |
| 2019/0018544 A1 | 1/2019 | Rosenberg et al. | |
| 2020/0110506 A1 | 4/2020 | Rosenberg et al. | |
| 2020/0150805 A1* | 5/2020 | Kim ........................ | G06F 3/044 |
| 2021/0191571 A1* | 6/2021 | Lee ........................ | G06F 3/0446 |

FOREIGN PATENT DOCUMENTS

KR 10-2016-0082986 A 7/2016

* cited by examiner

*Primary Examiner* — Robin J Mishler
(74) *Attorney, Agent, or Firm* — Fenwick & West LLP

(57) ABSTRACT

A touch device includes: a touch panel including a plurality of X-touch lines and a plurality of Y-touch lines crossing each other; an X-touch driving part simultaneously transmitting at least two of a plurality of X-self signals to the plurality of X-touch lines and sequentially transmitting a plurality of X-mutual signals to the plurality of X-touch lines; and a Y-touch driving part simultaneously transmitting at least two of a plurality of Y-self signals to the plurality of Y-touch lines and transmitting at least two of a plurality of Y-mutual signals to the plurality of Y-touch lines.

15 Claims, 10 Drawing Sheets

TOUCH DEVICE, TOUCH DISPLAY DEVICE INCLUDING THE SAME AND METHOD OF DRIVING THE SAME

CROSS REFERENCE TO RELATED APPLICATIONS

The present application claims the priority benefit of Republic of Korea Patent Application No. 10-2020-0186109 filed in Republic of Korea on Dec. 29, 2020, which is hereby incorporated by reference herein in its entirety.

BACKGROUND

Technical Field

The present disclosure relates to a touch device, and more particularly, to a touch device where a charging time of a touch signal is compensated by simultaneously applying a touch signal to at least two touch lines, a touch display device including the touch device and a method of driving the touch device.

Discussion of the Related Art

As the information age progresses, display devices have rapidly advanced. A liquid crystal display (LCD) device, an organic light emitting diode (OLED) display device and a field emission display (FED) device have been developed and widely used as a flat panel display (FPD) having a thin profile, a light weight and a low power consumption.

Recently, a touch display device referred to as a touch screen where a touch panel is disposed on a display panel has been widely used.

The touch display device is used as an output device displaying an image and as an input device receiving an order of a user by a touch on a portion of the image. The touch panel of the touch display device may be classified into a resistive type, a capacitive type, an infrared type and a surface acoustic wave type according to a method of detecting a position information.

When the user watches the image of the display panel and touches the touch panel, the touch panel detects a position information of the touched portion and recognizes an order of the user by comparing the detected position information with a position information of the image.

In the touch display device, the touch panel may be attached to the display panel or the touch panel may be integrated on a substrate of the display panel.

As a resolution of the display panel increases, a resolution of the touch panel for a touch sensing increases. As a result, an accuracy of the touch sensing is reduced.

Further, as a resolution of the display panel increases, a touch frequency of the touch panel for a touch sensing increases. As a result, a charging time of a touch signal for the touch sensing is reduced and a touch sensitivity is deteriorated.

SUMMARY

Accordingly, the present disclosure is directed to a touch device, a touch display device including the touch device and a method of driving the touch device that substantially obviate one or more of the problems due to limitations and disadvantages of the related art.

An object of the present disclosure is to provide a touch device where the accuracy of a touch sensing increases, a touch display device including the touch device and a method of driving the touch device. In accordance with embodiments of the present disclosure, the object may be achieved by a touch device sensing a touch through a self-capacitive type and a mutual capacitive type, a touch display device including the touch device, and a method of driving the touch device.

Another object of the present disclosure is to provide a touch device where a charging time is compensated for and touch sensitivity is improved by simultaneously applying a touch signal to at least two touch lines and scanning such that a touch signal applied to at least one touch line is duplicated, a touch display device including the touch device and a method of driving the touch device. In accordance with embodiments of the present disclosure, the object may be achieved by a touch device simultaneously applying a touch signal to at least two touch lines and scanning such that a touch signal applied to at least one touch line is duplicated, a touch display device including the touch device, and a method of driving the touch device.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a touch device and a method of driving a touch device according to the independent claims are provided. Further embodiments are described in the dependent claims. In an aspect, a touch device includes: a touch panel including a plurality of X-touch lines and a plurality of Y-touch lines crossing each other; an X-touch driving part simultaneously transmitting at least two of a plurality of X-self signals to the plurality of X-touch lines and sequentially transmitting a plurality of X-mutual signals to the plurality of X-touch lines; and a Y-touch driving part simultaneously transmitting at least two of a plurality of Y-self signals to the plurality of Y-touch lines and transmitting at least two of a plurality of Y-mutual signals to the plurality of Y-touch lines.

In another aspect, a touch display device includes: a display device displaying an image; and a touch device sensing a touch corresponding to the image, wherein the display device includes: a timing controlling part generating an image data, a data control signal and a gate control signal; a data driving part generating a data voltage using the image data and the data control signal; a gate driving part generating a gate voltage using the gate control signal; and a display panel displaying the image using the data voltage and the gate voltage, and wherein the touch device includes: a touch panel including a plurality of X-touch lines and a plurality of Y-touch lines crossing each other; an X-touch driving part simultaneously transmitting at least two of a plurality of X-self signals to the plurality of X-touch lines and sequentially transmitting a plurality of X-mutual signals to the plurality of X-touch lines; and a Y-touch driving part simultaneously transmitting at least two of a plurality of Y-self signals to the plurality of Y-touch lines and transmitting at least two of a plurality of Y-mutual signals to the plurality of Y-touch lines.

In another aspect, a method of driving a touch device includes: simultaneously transmitting at least two of a plurality of Y-self signals to a plurality of Y-touch lines of a touch panel by a Y-touch driving part; simultaneously transmitting at least two of a plurality of X-self signals to a plurality of X-touch lines of the touch panel by an X-touch driving part; simultaneously transmitting at least two of a plurality of Y-mutual signals to the plurality of Y-touch lines by the Y-touch driving part; and sequentially transmitting the plurality of X-mutual signals to the plurality of X-touch lines by the X-touch driving part.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
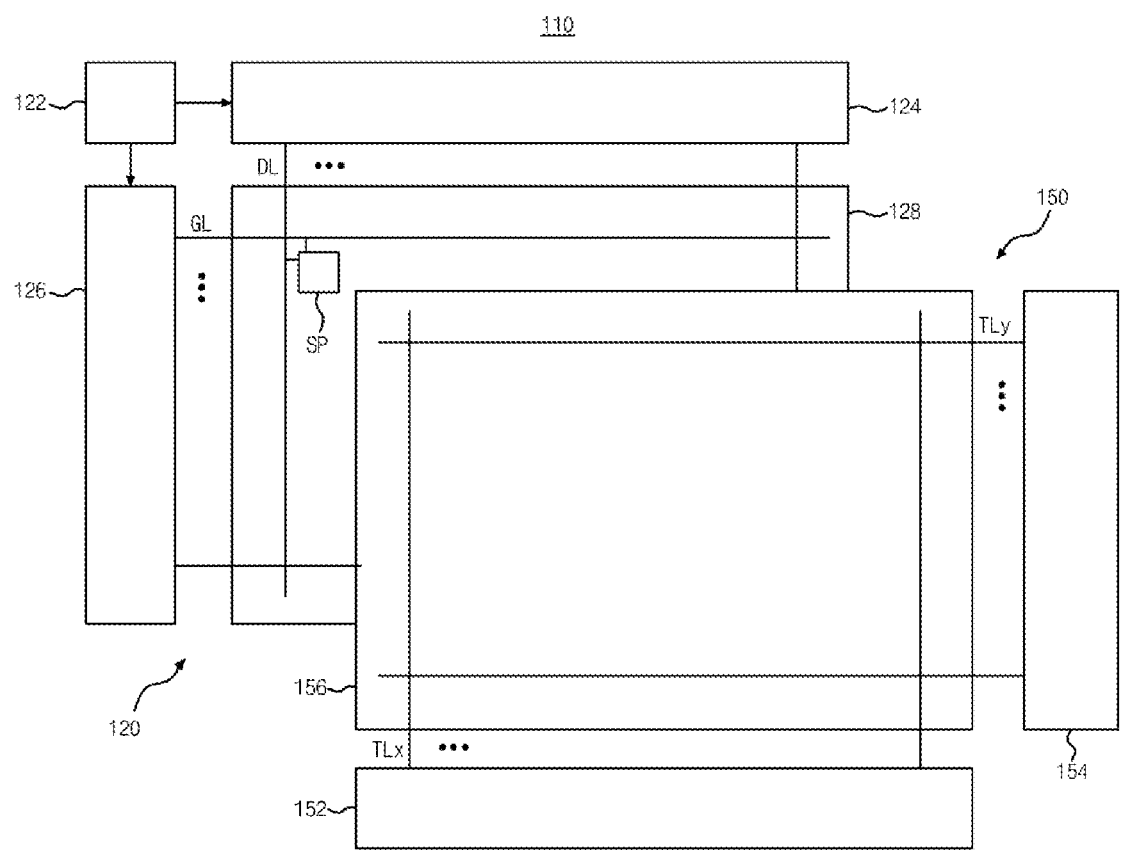
FIG. 1 is a view showing a touch display device according to a first embodiment of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, a touch device, a touch display device including the touch device and a method of driving the touch device according to embodiments of the present disclosure will be described in detail with reference to the accompanying drawings. In the following description, like reference numerals designate like elements throughout. When a detailed description of well-known functions or configurations related to this document is determined to unnecessarily cloud a gist of the inventive concept, the detailed description thereof will be omitted or will be made brief.

FIG. 1 is a view showing a touch display device according to a first embodiment of the present disclosure.

In FIG. 1, a touch display device 110 according to a first embodiment of the present disclosure includes a display device 120 and a touch device 150.

The display device 120 includes a timing controlling part 122, a data driving part 124, a gate driving part 126 and a display panel 128. The display device 120 may include an organic light emitting diode (OLED) display device or a liquid crystal display (LCD) device.

The timing controlling part 122 generates an image data, a data control signal and a gate control signal using an image signal and a plurality of timing signals of a data enable signal, a horizontal synchronization signal, a vertical synchronization signal and a clock transmitted from an external system such as a graphic card or a television system. The timing controlling part 122 transmits the image data and the data control signal to the data driving part 124 and transmits the gate control signal to the gate driving part 126.

The data driving part 124 generates a data voltage (a data signal) using the data control signal and the image data transmitted from the timing controlling part 122 and applies the data voltage to a data line DL of the display panel 128.

The gate driving part 126 generates a gate voltage (a gate signal) using the gate control signal transmitted from the timing controlling part 122 and applies the gate voltage to a gate line GL of the display panel 128.

The gate driving part 126 may be a gate-in-panel (GIP) type where the gate driving part 126 is disposed on a substrate of the display panel 128 having the gate line GL, the data line DL and a subpixel SP.

The display panel 128 displays an image using the gate voltage and the data voltage and includes a subpixel SP, a gate lines GL and a data line DL. The gate line GL and the data line DL cross each other to define the subpixel SP, and the subpixel SP is connected to the gate line GL and the data line DL.

When the display device 120 is an OLED display device, the subpixel SP may include a switching thin film transistor (TFT), a driving TFT, a storage capacitor and a light emitting diode. When the display device 120 is an LCD device, the subpixel SP may include a TFT, a storage capacitor and a liquid crystal capacitor.

The touch device 150 includes an X-touch driving part 152, a Y-touch driving part 154 and a touch panel 156. The touch device 150 may be driven by dividing one touch period TP (of FIG. 2) with respect to a time through a self-capacitive type and a mutual capacitive type.

In the self-capacitive type, a voltage is applied to a touch line independent by areas and a change of a capacitance of the touch line itself due to a touch is detected. In the mutual capacitive type, a touch transmitting line and a touch receiving line are independently disposed and a change of a capacitance between the touch transmitting line and the touch receiving line due to a touch is detected.

Figure 3B:
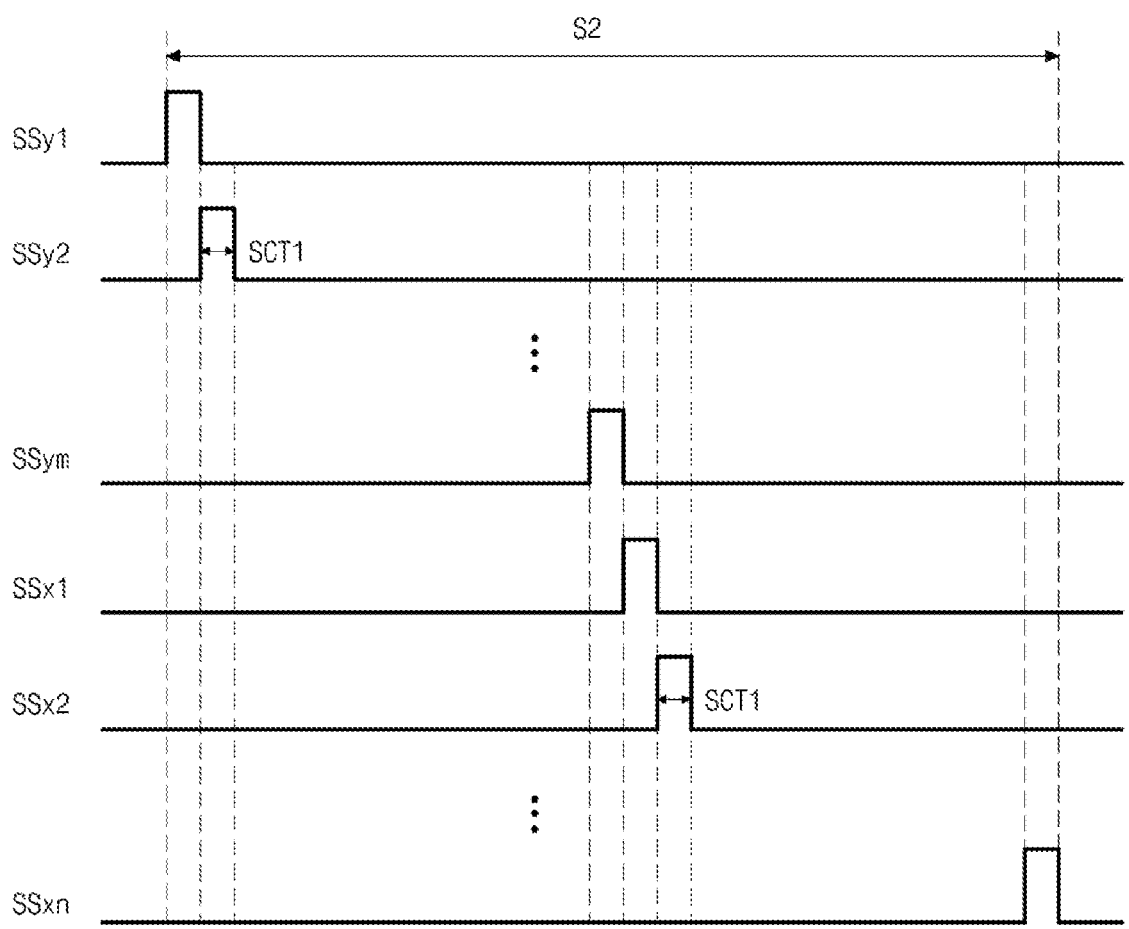
FIG. 3B is a timing diagram showing a touch signal in a self-capacitive type of a touch device of a touch display device according to a first embodiment of the present disclosure.
Figure 4A:
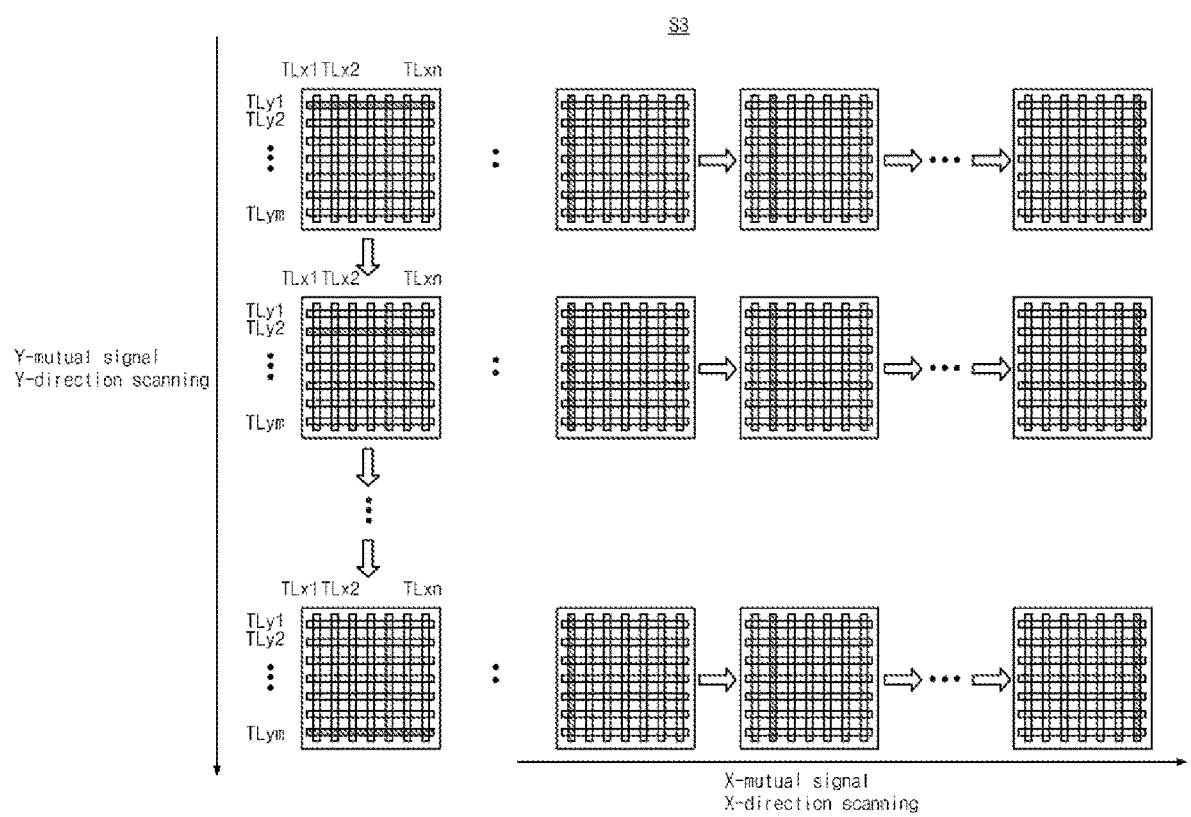
FIG. 4A is a view showing an application order of a touch signal in a mutual capacitive type of a touch device of a touch display device according to a first embodiment of the present disclosure.
Figure 4B:
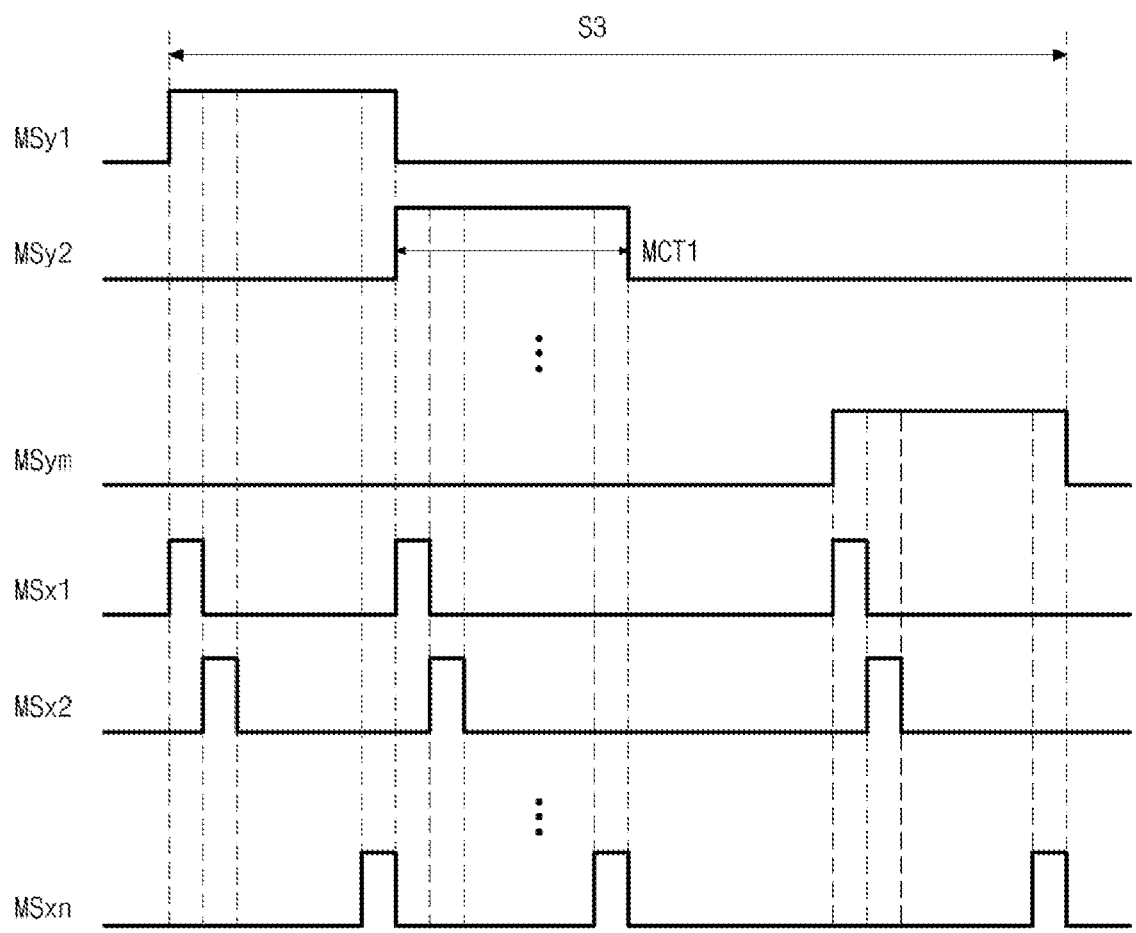
FIG. 4B is a timing diagram showing a touch signal in a mutual capacitive type of a touch device of a touch display device according to a first embodiment of the present disclosure.

The X-touch driving part 152 transceives (transmits and receives) an X-touch signal with a plurality of X-touch lines TLx of the touch panel 156, and the X-touch signal may include an X-self signal SSx (of FIG. 3B) and an X-mutual signal MSx (of FIG. 4B).

The Y-touch driving part 154 transceives (transmits and receives) a Y-touch signal with a plurality of Y-touch lines TLy of the touch panel 156, and the Y-touch signal may include a Y-self signal SSy (of FIG. 3B) and a Y-mutual signal MSy (of FIG. 4B).

While the touch device 150 is driven through a self-capacitive type, the Y-touch driving part 154 sequentially applies the Y-self signal SSy to the plurality of Y-touch lines TLy to detect a change of a capacitance of the plurality of Y-touch lines TLy themselves due to a touch and the X-touch driving part 152 sequentially applies the X-self signal SSx to the plurality of X-touch lines TLx to detect a change of a capacitance of the plurality of X-touch lines TLx themselves due to a touch.

While the touch device 150 is driven through a mutual capacitive type, the Y-touch driving part 154 sequentially applies the Y-mutual signal MSy to the plurality of Y-touch lines TLy and receives the X-mutual signal MSx from the plurality of X-touch lines TLx to detect a change of a capacitance between the plurality of Y-touch lines TLy and the plurality of X-touch lines TLx due to a touch.

The X-touch driving part 152 and the Y-touch driving part 154 may calculate a touch position from the change of the capacitance detected through the self-capacitive type or the mutual capacitive type.

The touch panel 156 includes the plurality of X-touch lines TLx and the plurality of Y-touch lines TLy crossing each other. The plurality of X-touch lines TLx may be disposed along a Y-direction (a vertical direction) and may be separated in parallel from each other along an X-direction (a horizontal direction). The plurality of Y-touch lines TLy may be disposed along the X-direction and may be separated in parallel from each other along the Y-direction.

A method of driving the touch device 150 of the touch display device 110 will be illustrated with reference to drawings.

Figure 2:
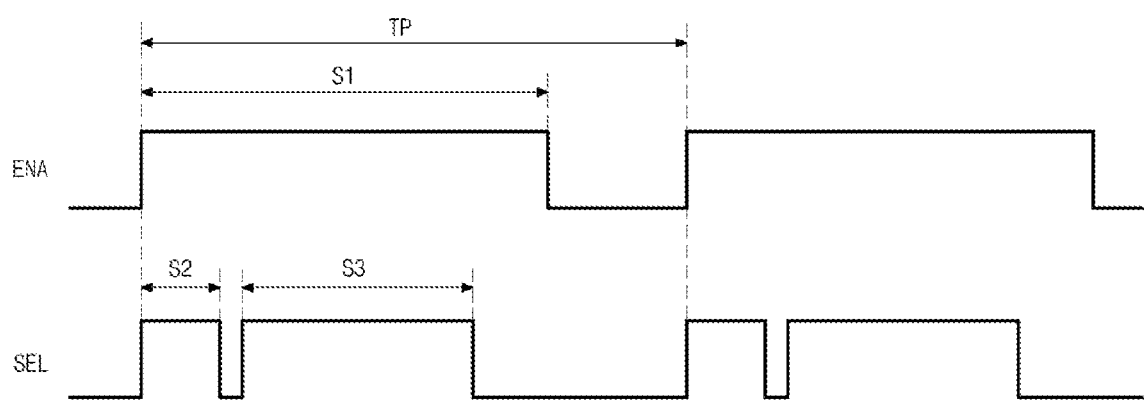
FIG. 2 is a timing chart showing a touch period of a touch device of a touch display device according to a first embodiment of the present disclosure.

FIG. 2 is a timing chart showing a touch period of a touch device of a touch display device according to a first embodiment of the present disclosure.

In FIG. 2, the touch device 150 of the touch display device 110 senses a touch according to an enable signal ENA by a touch period TP. During a first section S1 of one touch period TP where the enable signal ENA has a high level, a touch signal is applied to the touch panel 156 and a touch is sensed.

For example, the touch device 150 may be driven with about 120 Hz, about 180 Hz and about 240 Hz, and one touch period TP may be about 8.3 μs, about 5.6 μs and about 4.2 μs, respectively.

In addition, the touch device 150 is driven through a self-capacitive type during a second section S2 in the first section S1 where a selection signal SEL has a first high level, and the touch device 150 is driven through a mutual capacitive type during a third section S3 in the first section S1 where the selection signal SEL has a second high level.

Figure 3A:
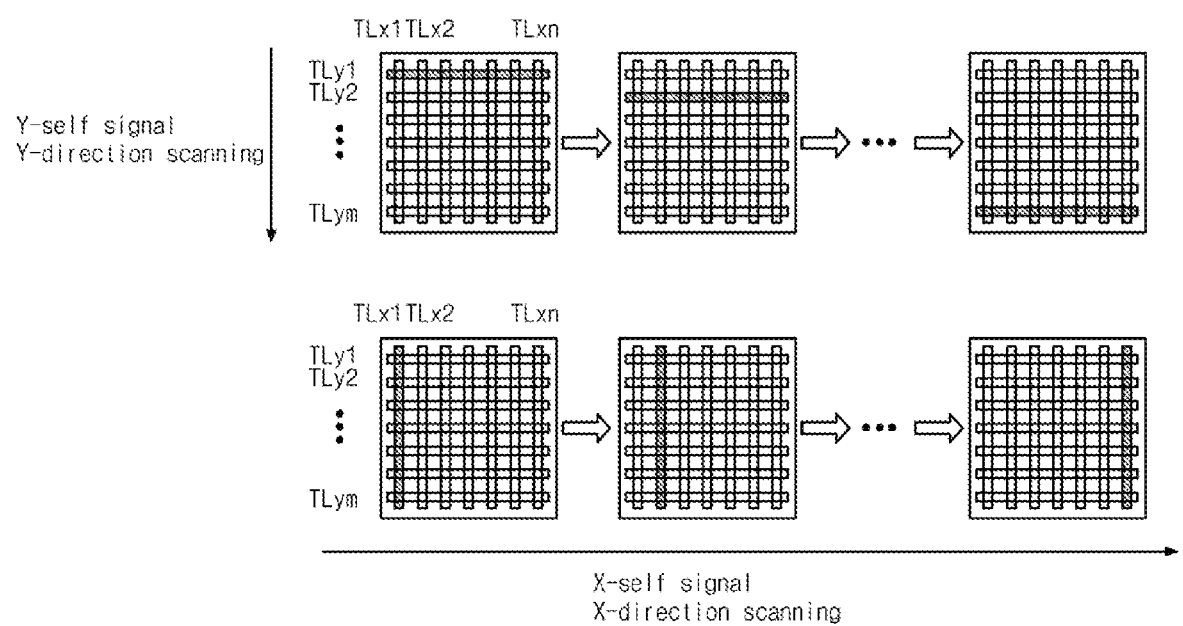
FIG. 3A is a view showing an application order of a touch signal in a self-capacitive type of a touch device of a touch display device according to a first embodiment of the present disclosure.

FIG. 3A is a view showing an application order of a touch signal in a self-capacitive type of a touch device of a touch display device according to a first embodiment of the present disclosure, and FIG. 3B is a timing diagram showing a touch signal in a self-capacitive type of a touch device of a touch display device according to a first embodiment of the present disclosure. FIG. 4A is a view showing an application order of a touch signal in a mutual capacitive type of a touch device of a touch display device according to a first embodiment of the present disclosure, and FIG. 4B is a timing diagram showing a touch signal in a mutual capacitive type of a touch device of a touch display device according to a first embodiment of the present disclosure.

In FIGS. 3A and 3B, during the second section S2 where the touch device 150 is driven through a self-capacitive type, the Y-touch driving part 154 sequentially transmits the plurality of Y-self signals SSy1 to SSym to the plurality of Y-touch lines TLy1 to TLym and detects a change of a capacitance of the plurality of Y-touch lines TLy1 to TLym themselves due to a touch. As a result, the Y-touch driving part 154 may calculate a Y-coordinate of a touch position.

Next, the X-touch driving part 152 sequentially transmits the plurality of X-self signals SSx1 to SSxn to the plurality of X-touch lines TLx1 to TLxn and detects a change of a capacitance of the plurality of X-touch lines TLx1 to TLxn themselves due to a touch. As a result, the X-touch driving part 152 may calculate an X-coordinate of the touch position.

Accordingly, during the second section S2, the X-touch driving part 152 and the Y-touch driving part 154 may sense a touch by calculating the X-coordinate and the Y-coordinate of the touch position through a self-capacitive type.

Here, each of the plurality of Y-self signals SSy1 to SSym and the plurality of X-self signals SSx1 to SSxn has a pulse of a high level. During a first self-charging time period SCT1 of a width of the pulse, the plurality of Y-self signals SSy1 to SSym and the plurality of X-self signals SSx1 to SSxn may be charged to the plurality of Y-touch lines TLy1 to TLym and the plurality of X-touch lines TLx1 to TLxn, respectively.

In FIGS. 4A and 4B, during the third section S3 where the touch device 150 is driven through a mutual capacitive type, the Y-touch driving part 154 sequentially transmits the plurality of Y-mutual signals MSy1 to MSym to the plurality of Y-touch lines TLy1 to TLym. Each of the plurality of Y-mutual signals MSy1 to MSym may have a pulse of a high level.

While the plurality of Y-mutual signals MSy1 to MSym have the high level in the third section S3, the X-touch driving part 152 sequentially transmits the plurality of X-mutual signals MSx1 to MSxn to the plurality of touch lines TLx1 to TLxn. Each of the plurality of X-mutual signals MSx to MSn may have a pulse of a high level, and a width of the pulse of each of the plurality of X-mutual signals MSx1 to MSxn may be smaller than a width of the pulse of each of the plurality of Y-mutual signals MSy1 to MSym.

Accordingly, during the third section S3, the Y-touch driving part 154 and the X-touch driving part 152 may detect a change of a capacitance between the plurality of Y-touch lines TLy1 to TLym and the plurality of X-touch lines TLx1 to TLxn due to a touch and may sense a touch by calculating the Y-coordinate and the X-coordinate of the touch position through a mutual capacitive type.

Here, during a first mutual charging time period MCT1 of a width of the pulse of the plurality of Y-mutual signals MSy1 to MSym, the pulse of the plurality of Y-mutual signals MSy1 to MSym may be charged to the plurality of Y-touch lines TLy1 to TLym, respectively.

In the touch display device 110 according to a first embodiment of the present disclosure, since the touch is sensed by calculating the coordinate of the touch position twice through a self-capacitive type and a mutual capacitive type and verifying the coordinates, the accuracy of a touch sensing is improved.

In the touch display device 110 according to a first embodiment of the present disclosure, as the resolution of the display panel 128 increases, the resolution and the touch frequency of the touch panel 156 increase. In addition, as the touch frequency increases, the first self-charging time period SCT1 and the first mutual charging time period MCT1 decrease. As a result, since the plurality of Y-self signals SSy1 to SSym, the plurality of X-self signals SSx1 to SSxn and the plurality of Y-mutual signals MSy1 to MSym may not be applied during a sufficient charging time period, touch sensitivity may be deteriorated.

In another embodiment, touch sensitivity may be improved by increasing a charging time period.

Figure 5A:
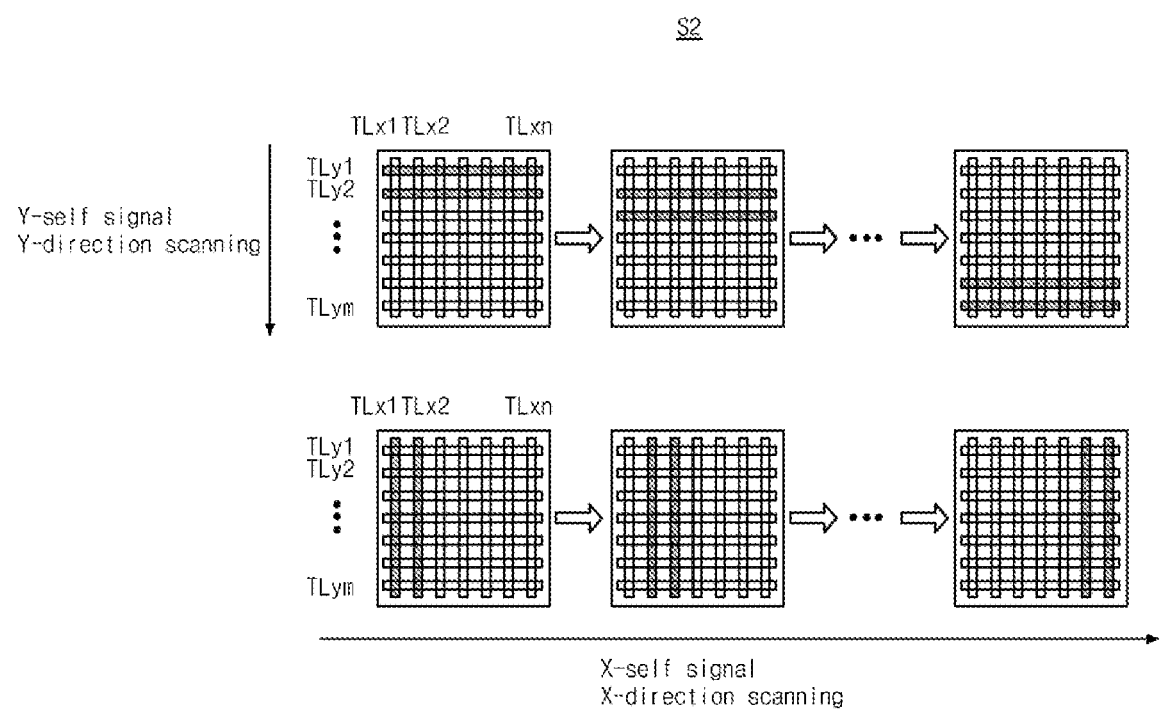
FIG. 5A is a view showing an application order of a touch signal in a self-capacitive type of a touch device of a touch display device according to a second embodiment of the present disclosure.
Figure 5B:
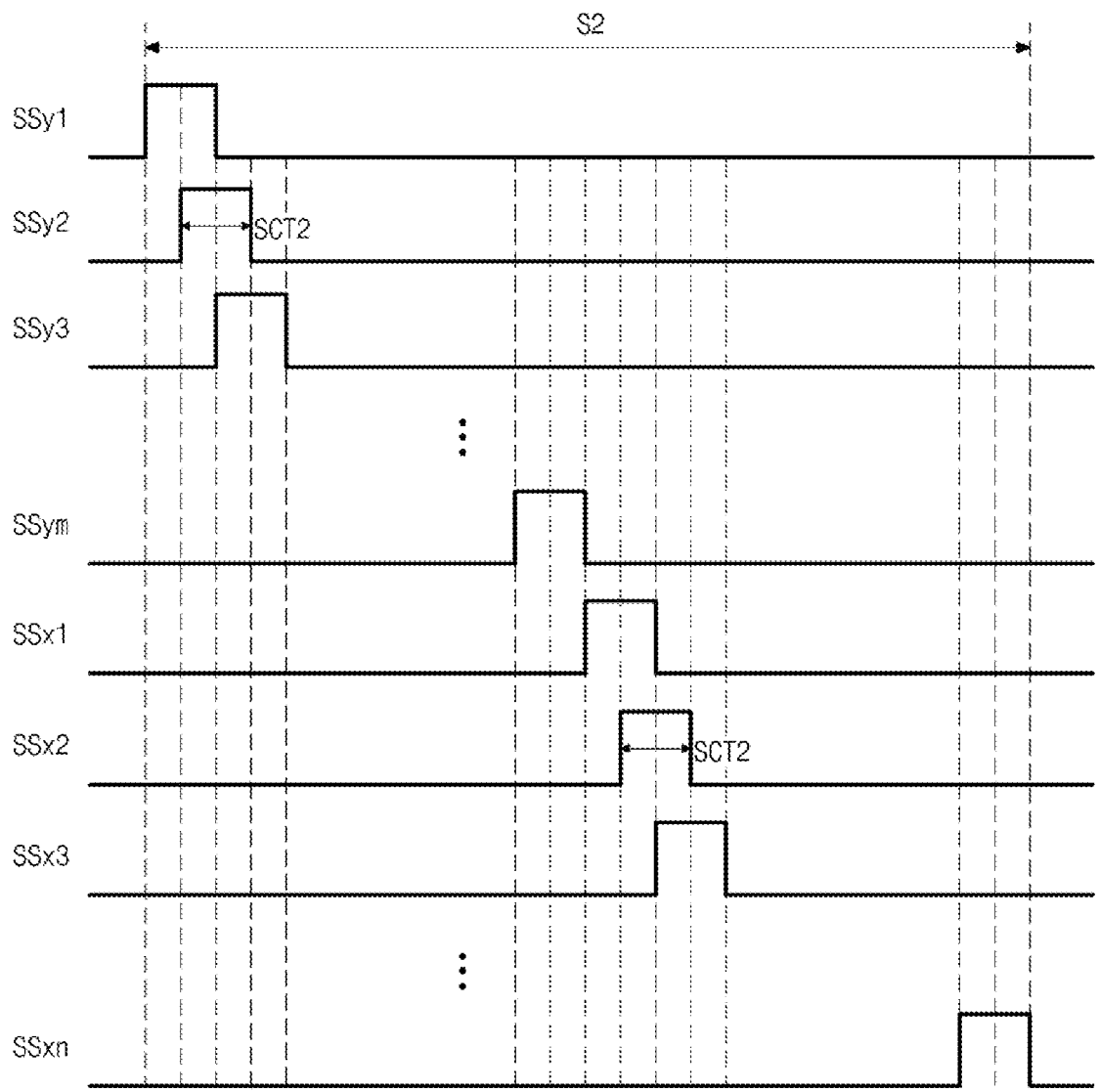
FIG. 5B is a timing diagram showing a touch signal in a self-capacitive type of a touch device of a touch display device according to a second embodiment of the present disclosure.
Figure 6A:
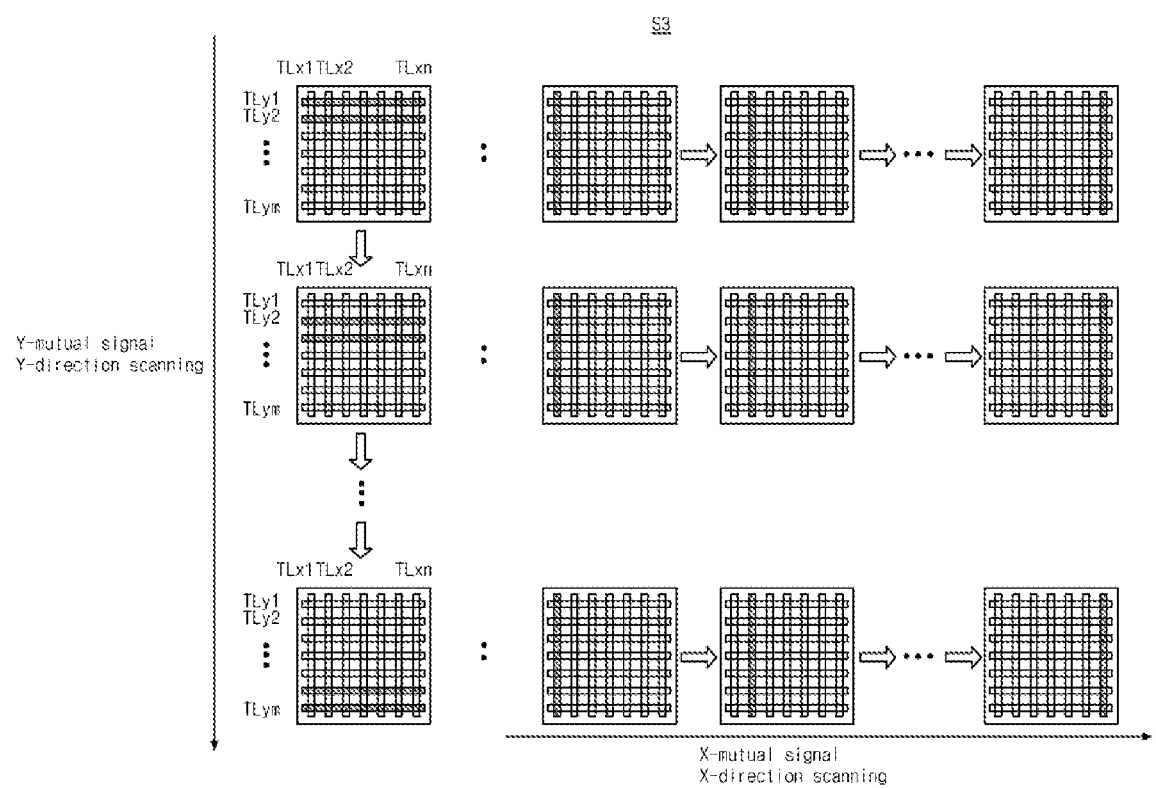
FIG. 6A is a view showing an application order of a touch signal in a mutual capacitive type of a touch device of a touch display device according to a second embodiment of the present disclosure.
Figure 6B:
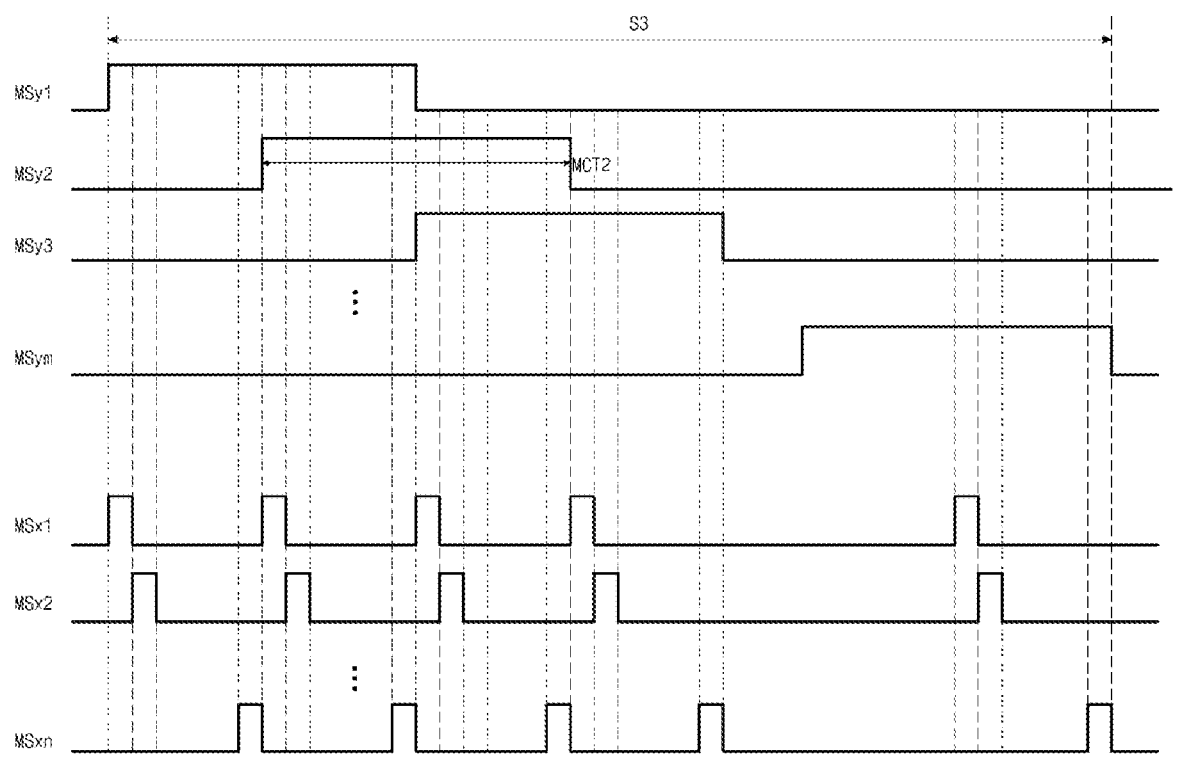
FIG. 6B is a timing diagram showing a touch signal in a mutual capacitive type of a touch device of a touch display device according to a second embodiment of the present disclosure.

FIG. 5A is a view showing an application order of a touch signal in a self-capacitive type of a touch device of a touch display device according to a second embodiment of the present disclosure, and FIG. 5B is a timing diagram showing a touch signal in a self-capacitive type of a touch device of a touch display device according to a second embodiment of the present disclosure. FIG. 6A is a view showing an application order of a touch signal in a mutual capacitive type of a touch device of a touch display device according to a second embodiment of the present disclosure, and FIG. 6B is a timing diagram showing a touch signal in a mutual capacitive type of a touch device of a touch display device according to a second embodiment of the present disclosure. A structure and a touch period of a touch display device according to a second embodiment are the same as a structure and a touch period of a touch display device according to a first embodiment.

In FIGS. 5A and 5B, during a second section S2 where a touch device 150 is driven through a self-capacitive type, a Y-touch driving part 154 simultaneously transmits at least two of a plurality of Y-self signals SSy1 to SSym to at least two of a plurality of Y-touch lines TLy1 to TLym and sequentially transmits the plurality of Y-self signals SSy1 to SSym to the plurality of Y-touch lines TLy1 to TLym as a whole. Further, the Y-touch driving part 154 detects the change of a capacitance of the plurality of Y-touch lines TLy1 to TLym themselves due to a touch. As a result, the Y-touch driving part 154 may calculate a Y-coordinate of a touch position.

Here, the Y-self signal SSy1 to SSym applied to at least one of the plurality of Y-touch lines TLy1 to TLym may be duplicated during a scanning.

For example, the first and second Y-self signals SSy1 and SSy2 may be simultaneously transmitted to the first and second Y-touch lines TLy1 and TLy2, respectively, the second and third Y-self signals SSy2 and SSy3 may be simultaneously transmitted to the second and third Y-touch lines TLy2 and TLy3, respectively, and the third and fourth Y-self signals SSy3 and SSy4 may be simultaneously transmitted to the third and fourth Y-touch lines TLy3 and TLy4, respectively. As a result, the second and third Y-self signals SSy2 and SSy3 applied to the second and third Y-touch lines TLy2 and TLy3, respectively, may be overlapping from the three times signal transmission.

Next, the X-touch driving part 152 simultaneously transmits at least two of a plurality of X-self signals SSx1 to SSxn to at least two of a plurality of X-touch lines TLx1 to TLxn and sequentially transmits the plurality of X-self signals SSx1 to SSxn to the plurality of X-touch lines TLx1 to TLxn as a whole. Further, the X-touch driving part 154 detects the change of a capacitance of the plurality of X-touch lines TLx1 to TLxn themselves due to a touch. As a result, the X-touch driving part 152 may calculate an X-coordinate of the touch position.

Here, the X-self signal SSx1 to SSxn applied to at least one of the plurality of X-touch lines TLx1 to TLxn may be duplicated during a scanning.

For example, the first and second X-self signals SSx1 and SSx2 may be simultaneously transmitted to the first and second X-touch lines TLx1 and TLx2, respectively, the second and third X-self signals SSx2 and SSx3 may be simultaneously transmitted to the second and third X-touch lines TLx2 and TLx3, respectively, and the third and fourth X-self signals SSx3 and SSx4 may be simultaneously transmitted to the third and fourth X-touch lines TLx3 and TLx4, respectively. As a result, the second and third X-self signals SSx2 and SSx3 applied to the second and third X-touch lines TLx2 and TLx3, respectively, may be overlapping from the three times signal transmission.

Accordingly, during the second section S2, the X-touch driving part 152 and the Y-touch driving part 154 may sense a touch by calculating the X-coordinate and the Y-coordinate of the touch position through a self-capacitive type.

Here, each of the plurality of Y-self signals SSy1 to SSym and the plurality of X-self signals SSx1 to SSxn has a pulse of a high level. During a second self-charging time period SCT2 of a width of the pulse, the plurality of Y-self signals SSy1 to SSym and the plurality of X-self signals SSx1 to SSxn may be charged to the plurality of Y-touch lines TLy1 to TLym and the plurality of X-touch lines TLx1 to TLxn, respectively.

The second self-charging time period SCT2 of the touch device 150 according to the second embodiment of the present disclosure may be greater than (e.g., may be about twice of) the first self-charging time period SCT1 of the touch device 150 according to the first embodiment of the present disclosure. As a result, the charging time of the plurality of Y-self signals SSy1 to SSym and the plurality of X-self signals SSx1 to SSxn to the plurality of Y-touch lines TLy1 to TLym and the plurality of X-touch lines TLx1 to TLxn increases and the touch sensitivity is improved.

In FIGS. 6A and 6B, during a third section S3 where the touch device 150 is driven through a mutual capacitive type, the Y-touch driving part 154 simultaneously transmits at least two of a plurality of Y-mutual signals MSy1 to MSym to at least two of the plurality of Y-touch lines TLy1 to TLym and sequentially transmits the plurality of Y-mutual signals MSy1 to MSym to the plurality of Y-touch lines TLy1 to TLym as a whole. Each of the plurality of Y-mutual signals MSy1 to MSym may have a pulse of a high level.

Here, the Y-mutual signal MSy1 to MSym applied to at least one of the plurality of Y-touch lines TLy1 to TLym may be duplicated during a scanning.

For example, the first and second Y-mutual signals MSy1 and MSy2 may be simultaneously transmitted to the first and second Y-touch lines TLy1 and TLy2, respectively, the second and third Y-mutual signals MSy2 and MSy3 may be simultaneously transmitted to the second and third Y-touch lines TLy2 and TLy3, respectively, and the third and fourth Y-mutual signals MSy3 and MSy4 may be simultaneously transmitted to the third and fourth Y-touch lines TLy3 and TLy4, respectively. As a result, the second and third Y-mutual signals MSy2 and MSy3 applied to the second and third Y-touch lines TLy2 and TLy3, respectively, may be overlapping from the three times signal transmission.

While the plurality of Y-mutual signals MSy1 to MSym have the high level in the third section S3, the X-touch driving part 152 sequentially transmits the plurality of X-mutual signals MSx1 to MSxn to the plurality of touch lines TLx1 to TLxn. Each of the plurality of X-mutual signals MSx to MSn may have a pulse of a high level, and the width of the pulse of each of the plurality of X-mutual signals MSx1 to MSxn may be smaller than the width of the pulse of each of the plurality of Y-mutual signals MSy1 to MSym.

Accordingly, during the third section S3, the Y-touch driving part 154 and the X-touch driving part 152 may detect a change of capacitance between the plurality of Y-touch lines TLy1 to TLym and the plurality of X-touch lines TLx1 to TLxn due to a touch and may sense a touch by calculating the Y-coordinate and the X-coordinate of the touch position through a mutual capacitive type.

The Y-coordinate of the touch position may be calculated from three of the plurality of Y-mutual signals MSy1 to MSym where a change of a capacitance is detected.

For example, when a touch occurs at a position corresponding to the second touch line TLy2, a change of a capacitance may be detected at a timing of simultaneously transmitting the first and second Y-mutual signals MSy1 and MSy2 and a timing of simultaneously transmitting the second and third Y-mutual signals MSy2 and MSy3 and the second touch line TLy2 where the second Y-mutual signal MSy2 duplicated among the first to third Y-mutual signals MSy1 to MSy3 is applied may be calculated as a Y-coordinate of a touch position.

Similarly, when a touch occurs at a position corresponding to the third touch line TLy3, a change of capacitance may be detected at a timing of simultaneously transmitting the second and third Y-mutual signals MSy2 and MSy3 and the timing of simultaneously transmitting the third and fourth Y-mutual signals MSy3 and MSy4 and the third touch line TLy3 where the third Y-mutual signal MSy3 duplicated among the second to fourth Y-mutual signals MSy2 to MSy4 is applied may be calculated as a Y-coordinate of a touch position.

Here, during a second mutual charging time period MCT2 of a width of the pulse of the plurality of Y-mutual signals MSy1 to MSym, the pulse of the plurality of Y-mutual signals MSy1 to MSym may be charged to the plurality of Y-touch lines TLy1 to TLym, respectively.

The second mutual time period MCT2 of the touch device 150 according to a second embodiment of the present disclosure may be greater than (e.g., may be about twice of) the first mutual charging time period MCT1 of the touch device 150 according to the first embodiment of the present disclosure. As a result, the charging time of the plurality of Y-mutual signals MSy1 to MSym to the plurality of Y-touch lines TLy1 to TLym increases and the touch sensitivity is improved.

In the touch display device 110 according to the second embodiment of the present disclosure, since the touch is sensed by calculating the coordinate of the touch position through a self-capacitive type and a mutual capacitive type and verifying the coordinates, the accuracy of a touch sensing is improved.

In the self-capacitive type, at least two of the plurality of Y-self signals SSy1 to SSym are simultaneously transmitted to at least two of the plurality of Y-touch lines TLy1 to TLym, and scanning is performed such that at least one of the plurality of Y-self signals SSy1 to SSym is duplicated. Further, at least two of the plurality of X-self signals SSx1 to SSxn are simultaneously transmitted to at least two of the plurality of X-touch lines TLx1 to TLxn, and scanning is performed such that at least one of the plurality of X-self signals SSx1 to SSxn is duplicated. In the mutual capacitive type, at least two of the plurality of Y-mutual signals MSy1 to MSym are simultaneously transmitted to at least two of the plurality of Y-touch lines TLy1 to TLym, and scanning is performed such that at least one of the plurality of Y-mutual signals MSy1 to MSym is duplicated. As a result, the charging time of the touch signal is compensated for and the touch sensitivity is improved.

Although the plurality of Y-self signals SSy1 to SSym and the plurality of Y-mutual signals MSy1 to MSym are simultaneously applied to two of the plurality of Y-touch lines TLy1 to TLym in a second embodiment, the plurality of Y-self signals SSy1 to SSym and the plurality of Y-mutual signals MSy1 to MSym may be simultaneously applied to three of the plurality of Y-touch lines TLy1 to TLym in another embodiment. In this case, the plurality of Y-self signals SSy1 to SSym and the plurality of Y-mutual signals MSy1 to MSym applied to at least two of the plurality of Y-touch lines TLy1 to TLym may be duplicate during a scanning.

In a touch display device, as a resolution of a display panel increases, a resolution and a touch frequency of a touch panel increase. As a result, a charging time of a touch signal for touch sensing is reduced and a touch sensitivity is deteriorated.

Consequently, in a touch device, a touch display device and a method of driving the touch device according to the first and second embodiments of the present disclosure, since a touch is sensed through a self-capacitive type and a mutual capacitive type, an accuracy of a touch sensing is improved.

In addition, as the touch frequency increases, the first self-charging time period SCT1 and the first mutual charging time period MCT1 in the touch display device according to the first embodiment of the present disclosure decrease. As a result, since the plurality of Y-self signals SSy1 to SSym, the plurality of X-self signals SSx1 to SSxn and the plurality of Y-mutual signals MSy1 to MSym may not be applied during a sufficient charging time period, a touch sensitivity may be deteriorated.

Consequently, since in the touch display device according to the second embodiment of the present disclosure, a touch signal is simultaneously applied to at least two touch lines and scanning is performed such that a touch signal applied to at least one touch line is duplicated, the charging time of a touch signal is compensated for and touch sensitivity is further improved.

It will be apparent to those skilled in the art that various modifications and variation can be made in the present disclosure without departing from the scope of the disclosure. Thus, it is intended that the present disclosure cover the modifications and variations of this disclosure provided they come within the scope of the appended claims.

What is claimed is:

1. A touch device comprising:
a touch panel including a plurality of X-touch lines and a plurality of Y-touch lines crossing each other;
an X-touch driving part simultaneously transmitting at least two of a plurality of X-self signals to the plurality of X-touch lines and sequentially transmitting a plurality of X-mutual signals to the plurality of X-touch lines, wherein each of the plurality of X-self signals are offset from each other and each of the plurality of X-mutual signals are offset from each other, and wherein the at least two of the plurality of X-self signals partially, but not entirely, overlap each other, and the plurality of X-mutual signals are separated from each other; and
a Y-touch driving part simultaneously transmitting at least two of a plurality of Y-self signals to the plurality of Y-touch lines and transmitting at least two of a plurality of Y-mutual signals to the plurality of Y-touch lines, wherein each of the plurality of Y-self signals are offset from each other and each of the plurality of Y-mutual signals are offset from each other, and wherein the at least two of the plurality of Y-self signals partially, but not entirely, overlap each other, and the at least two of the plurality of Y-mutual signals partially, but not entirely, overlap each other.

2. The touch device of claim 1, wherein the Y-touch driving part sequentially transmits the plurality of Y-self signals to the plurality of Y-touch lines for scanning and the plurality of Y-self signals applied to at least one of the plurality of Y-touch lines are duplicated during the scanning, and
wherein the Y-touch driving part sequentially transmits the plurality of Y-mutual signals to the plurality of Y-touch lines for scanning and the plurality of Y-mutual signals applied to at least one of the plurality of Y-touch lines are duplicated during the scanning.

3. The touch device of claim 2, wherein the Y-touch driving part:
calculates a Y-coordinate of a touch position from change of capacitance of the plurality of Y-touch lines themselves according to the plurality of Y-self signals; and calculates a Y-coordinate and an X-coordinate of a touch position from change of capacitance between the plurality of Y-touch lines and the plurality of X-touch lines according to the plurality of Y-mutual signals and the plurality of X-mutual signals.

4. The touch device of claim 1, wherein the X-touch driving part sequentially transmits the plurality of X-self signals to the plurality of X-touch lines for scanning and the plurality of X-self signals applied to at least one of the plurality of X-touch lines are duplicated during the scanning, and
wherein the X-touch driving part sequentially transmits the plurality of X-mutual signals to the plurality of X-touch lines for scanning.

5. The touch device of claim 4, wherein the X-touch driving part:
calculates an X-coordinate of a touch position from change of capacitance of the plurality of X-touch lines themselves according to the plurality of X-self signals; and
calculates an X-coordinate and a Y-coordinate of a touch position from change of capacitance between the plurality of X-touch lines and the plurality of Y-touch lines according to the plurality of X-mutual signals and the plurality of Y-mutual signals.

6. A touch display device comprising:
a display device displaying an image; and
a touch device sensing a touch corresponding to the image,
wherein the display device comprises:
a timing controlling part generating an image data, a data control signal and a gate control signal;
a data driving part generating a data voltage using the image data and the data control signal;
a gate driving part generating a gate voltage using the gate control signal; and
a display panel displaying the image using the data voltage and the gate voltage, and
wherein the touch device comprises:
a touch panel including a plurality of X-touch lines and a plurality of Y-touch lines crossing each other;
an X-touch driving part simultaneously transmitting at least two of a plurality of X-self signals to the plurality of X-touch lines and sequentially transmitting a plurality of X-mutual signals to the plurality of X-touch lines, wherein each of the plurality of X-self signals are offset from each other and each of the plurality of X-mutual signals are offset from each other, and wherein the at least two of the plurality of X-self signals partially, but not entirely, overlap each other, and the plurality of X-mutual signals are separated from each other; and
a Y-touch driving part simultaneously transmitting at least two of a plurality of Y-self signals to the plurality of Y-touch lines and transmitting at least two of a plurality of Y-mutual signals to the plurality of Y-touch lines, wherein each of the plurality of Y-self signals are offset from each other and each of the plurality of Y-mutual signals are offset from each other, and wherein the at least two of the plurality of Y-self signals partially, but not entirely, overlap each other, and the at least two of the plurality of Y-mutual signals partially, but not entirely, overlap each other.

7. The touch display device of claim 6, wherein the Y-touch driving part sequentially transmits the plurality of Y-self signals to the plurality of Y-touch lines for scanning and the plurality of Y-self signals applied to at least one of the plurality of Y-touch lines are duplicated during the scanning, and wherein the Y-touch driving part sequentially transmits the plurality of Y-mutual signals to the plurality of Y-touch lines for scanning and the plurality of Y-mutual signals applied to at least one of the plurality of Y-touch lines are duplicated during the scanning.

8. The touch display device of claim 7, wherein the Y-touch driving part:
calculates a Y-coordinate of a touch position from change of capacitance of the plurality of Y-touch lines themselves according to the plurality of Y-self signals; and
calculates a Y-coordinate and an X-coordinate of a touch position from change of capacitance between the plurality of Y-touch lines and the plurality of X-touch lines according to the plurality of Y-mutual signals and the plurality of X-mutual signals.

9. The touch display device of claim 6, wherein the X-touch driving part sequentially transmits the plurality of X-self signals to the plurality of X-touch lines for scanning and the plurality of X-self signals applied to at least one of the plurality of X-touch lines are duplicated during the scanning, and wherein the X-touch driving part sequentially transmits the plurality of X-mutual signals to the plurality of X-touch lines for scanning.

10. The touch display device of claim 9, wherein the X-touch driving part:
calculates an X-coordinate of a touch position from a change of capacitance of the plurality of X-touch lines themselves according to the plurality of X-self signals; and
calculates an X-coordinate and a Y-coordinate of a touch position from a change of capacitance between the plurality of X-touch lines and the plurality of Y-touch lines according to the plurality of X-mutual signals and the plurality of Y-mutual signals.

11. A method of driving a touch device, comprising:
simultaneously transmitting at least two of a plurality of Y-self signals to a plurality of Y-touch lines of a touch panel by a Y-touch driving part, each of the plurality of Y-self signals offset from each other;
simultaneously transmitting at least two of a plurality of X-self signals to a plurality of X-touch lines of the touch panel by an X-touch driving part, each of the plurality of X-self signals offset from each other;
simultaneously transmitting at least two of a plurality of Y-mutual signals to the plurality of Y-touch lines by the Y-touch driving part, each of the plurality of Y-mutual signals offset from each other and the at least two of the plurality of Y-mutual signals partially, but not entirely, overlapping each other; and
sequentially transmitting the plurality of X-mutual signals to the plurality of X-touch lines by the X-touch driving part, each of the plurality of X-mutual signals offset and separated from each other,
wherein the touch device is driven through a self-capacitive type during a second section in a single touch period and is driven through a mutual capacitive type during a third section subsequent to the second section in the single touch period.

12. The method of claim 11, wherein the Y-touch driving part sequentially transmits the plurality of Y-self signals to the plurality of Y-touch lines such that the plurality of Y-self signals applied to at least one of the plurality of Y-touch lines are duplicated for scanning, and wherein the Y-touch driving part sequentially transmits the plurality of Y-mutual signals to the plurality of Y-touch lines such that the plurality of Y-mutual signals applied to at least one of the plurality of Y-touch lines are duplicated for scanning.

13. The method of claim 11, wherein the X-touch driving part sequentially transmits the plurality of X-self signals to the plurality of X-touch lines such that the plurality of X-self signals applied to at least one of the plurality of X-touch lines are duplicated for scanning, and wherein the X-touch driving part sequentially transmits the plurality of X-mutual signals to the plurality of X-touch lines for scanning.

14. The touch device of claim 1,
wherein each of the plurality of X-self signals, the plurality of X-mutual signals, the plurality of Y-self signals and the plurality of Y-mutual signals has a pulse of a high level,
wherein a rear portion of the pulse of a first one of the at least two of the plurality of X-self signals and a front portion of the pulse of a second one of the at least two of the plurality of X-self signals overlap each other,
wherein a rear portion of the pulse of a first one of the at least two of the plurality of Y-self signals and a front portion of the pulse of a second one of the at least two of the plurality of Y-self signals overlap each other, and
wherein a rear portion of the pulse of a first one of the at least two of the plurality of Y-mutual signals and a front portion of the pulse of a second one of the at least two of the plurality of Y-mutual signals overlap each other.

15. The touch device of claim 14, wherein a width of the pulse of each of the plurality of X-mutual signals is smaller than a width of the pulse of each of the plurality of Y-mutual signals.

* * * * *